US009230175B2

(12) United States Patent
Gagvani et al.

(10) Patent No.: US 9,230,175 B2
(45) Date of Patent: Jan. 5, 2016

(54) SYSTEM AND METHOD FOR MOTION DETECTION IN A SURVEILLANCE VIDEO

(71) Applicant: CheckVideo LLC, Falls Chuch, VA (US)

(72) Inventors: Nikhil Gagvani, Sterling, VA (US); Alexei Gritai, Herndon, VA (US)

(73) Assignee: CheckVideo LLC, Falls Church, VA (US)

( * ) Notice: Subject to any disclaimer, the term of this patent is extended or adjusted under 35 U.S.C. 154(b) by 59 days.

(21) Appl. No.: 14/064,713

(22) Filed: Oct. 28, 2013

(65) Prior Publication Data

US 2014/0198257 A1 Jul. 17, 2014

Related U.S. Application Data

(62) Division of application No. 12/765,199, filed on Apr. 22, 2010, now Pat. No. 8,571,261.

(60) Provisional application No. 61/171,710, filed on Apr. 22, 2009.

(51) Int. Cl.
| | |
|---|---|
| *G06K 9/00* | (2006.01) |
| *G06T 7/20* | (2006.01) |
| *H04N 5/91* | (2006.01) |

(52) U.S. Cl.
CPC ........ *G06K 9/00765* (2013.01); *G06K 9/00543* (2013.01); *G06T 7/2053* (2013.01); *H04N 5/91* (2013.01); *G06T 2207/20144* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 4,081,830 | A | 3/1978 | Mick et al. |
| 4,623,837 | A | 11/1986 | Efron et al. |
| 4,679,077 | A | 7/1987 | Yuasa et al. |

(Continued)

FOREIGN PATENT DOCUMENTS

| | | |
|---|---|---|
| EP | 0482427 | 4/1992 |
| EP | 0917103 | 5/1999 |

(Continued)

OTHER PUBLICATIONS

International Search Report and Written Opinion for International Application No. PCT/US2008/084835, mailed Feb. 4, 2009.

(Continued)

*Primary Examiner* — Eueng-Nan Yeh
(74) *Attorney, Agent, or Firm* — Cooley LLP

(57) ABSTRACT

In some embodiments, a non-transitory processor-readable medium stores code representing instructions to cause a processor to smooth a current image of a scene to produce a smoothed image and subtract pixel values of a background image of the scene from corresponding pixel values of the smoothed image to produce an altitude difference image. Pixel values of the altitude difference image are weighted to produce a weighted difference image. The weighted difference image is convolved to produce a convoluted difference image. A threshold is applied to each pixel of the convoluted difference image to produce a thresholded difference image. Pixels having a value less than the threshold are removed from the thresholded difference image and classified as background pixels. Foreground pixels are determined based on the thresholded difference image.

19 Claims, 13 Drawing Sheets

(56) References Cited

U.S. PATENT DOCUMENTS

| | | |
|---|---|---|
| 4,737,847 A | 4/1988 | Araki et al. |
| 4,774,570 A | 9/1988 | Araki |
| 4,777,526 A | 10/1988 | Saitoh et al. |
| 4,814,869 A | 3/1989 | Oliver et al. |
| 4,857,912 A | 8/1989 | Everett, Jr. et al. |
| 4,905,296 A | 2/1990 | Nishihara |
| 4,943,854 A | 7/1990 | Shiota et al. |
| 5,033,015 A | 7/1991 | Zwirn |
| 5,142,367 A | 8/1992 | Hong |
| 5,142,592 A | 8/1992 | Moler |
| 5,161,107 A | 11/1992 | Mayeaux et al. |
| 5,272,527 A | 12/1993 | Watanabe |
| 5,289,275 A | 2/1994 | Ishii et al. |
| 5,455,561 A | 10/1995 | Brown |
| 5,486,819 A | 1/1996 | Horie |
| 5,537,483 A | 7/1996 | Stapleton et al. |
| 5,596,364 A | 1/1997 | Wolf et al. |
| 5,600,574 A | 2/1997 | Reitan |
| 5,602,585 A | 2/1997 | Dickinson et al. |
| 5,666,157 A | 9/1997 | Aviv |
| 5,671,009 A | 9/1997 | Chun |
| 5,689,443 A | 11/1997 | Ramanathan |
| 5,706,367 A | 1/1998 | Kondo |
| 5,708,423 A | 1/1998 | Ghaffari et al. |
| 5,712,830 A | 1/1998 | Ross et al. |
| 5,731,832 A | 3/1998 | Ng |
| 5,734,740 A | 3/1998 | Benn et al. |
| 5,751,844 A | 5/1998 | Bolin et al. |
| 5,754,225 A | 5/1998 | Naganuma |
| 5,761,326 A | 6/1998 | Brady et al. |
| 5,764,803 A | 6/1998 | Jacquin |
| 5,801,618 A | 9/1998 | Jenkins |
| 5,809,161 A | 9/1998 | Auty et al. |
| 5,827,942 A | 10/1998 | Madsen et al. |
| 5,875,305 A | 2/1999 | Winter et al. |
| 5,880,775 A | 3/1999 | Ross |
| 5,915,044 A | 6/1999 | Gardos |
| 5,930,379 A | 7/1999 | Rehg et al. |
| 5,956,424 A | 9/1999 | Wootton et al. |
| 5,956,716 A | 9/1999 | Kenner et al. |
| 5,969,755 A | 10/1999 | Courtney |
| 6,018,303 A | 1/2000 | Sadeh |
| 6,031,573 A | 2/2000 | MacCormack et al. |
| 6,067,373 A | 5/2000 | Ishida et al. |
| 6,078,619 A | 6/2000 | Monro |
| 6,088,137 A | 7/2000 | Tomizawa |
| 6,097,429 A | 8/2000 | Seeley et al. |
| 6,104,831 A | 8/2000 | Ruland |
| 6,137,531 A | 10/2000 | Kanzaki et al. |
| 6,154,133 A | 11/2000 | Ross et al. |
| 6,278,793 B1 | 8/2001 | Gur et al. |
| 6,366,701 B1 | 4/2002 | Chalom et al. |
| 6,370,480 B1 | 4/2002 | Gupta et al. |
| 6,377,299 B1 | 4/2002 | Hamada |
| 6,396,961 B1 | 5/2002 | Wixson et al. |
| 6,424,370 B1 | 7/2002 | Courtney |
| 6,424,741 B1 | 7/2002 | Shin et al. |
| 6,476,858 B1 | 11/2002 | Diaz et al. |
| 6,493,022 B1 | 12/2002 | Ho et al. |
| 6,493,023 B1 | 12/2002 | Watson |
| 6,493,024 B1 | 12/2002 | Hartley et al. |
| 6,493,041 B1 | 12/2002 | Hanko et al. |
| 6,502,045 B1 | 12/2002 | Biaglotti |
| 6,546,120 B1 | 4/2003 | Etoh et al. |
| 6,549,651 B2 | 4/2003 | Xiong et al. |
| 6,577,764 B2 | 6/2003 | Myler et al. |
| 6,577,826 B1 | 6/2003 | Misaizu et al. |
| 6,591,006 B1 | 7/2003 | Niemann |
| 6,597,800 B1 | 7/2003 | Murray et al. |
| 6,606,538 B2 | 8/2003 | Ponsot et al. |
| 6,625,383 B1 | 9/2003 | Wakimoto et al. |
| 6,628,323 B1 | 9/2003 | Wegmann |
| 6,650,774 B1 | 11/2003 | Szeliski |
| 6,654,483 B1 | 11/2003 | Bradski |
| 6,661,918 B1 | 12/2003 | Gordon et al. |
| 6,687,386 B1 | 2/2004 | Ito et al. |
| 6,690,839 B1 | 2/2004 | Ferguson |
| 6,696,945 B1 | 2/2004 | Venetianer |
| 6,700,487 B2 | 3/2004 | Lyons |
| 6,707,486 B1 | 3/2004 | Millet et al. |
| 6,735,337 B2 | 5/2004 | Lee et al. |
| 6,751,350 B2 | 6/2004 | Crinon |
| 6,754,372 B1 | 6/2004 | Collobert |
| 6,760,744 B1 | 7/2004 | Halaas et al. |
| 6,798,909 B2 * | 9/2004 | Miyatake et al. ............ 382/190 |
| 6,816,187 B1 | 11/2004 | Iwai et al. |
| 6,940,998 B2 | 9/2005 | Garoutte |
| 6,956,599 B2 | 10/2005 | Lim et al. |
| 6,975,220 B1 | 12/2005 | Foodman et al. |
| 7,015,806 B2 | 3/2006 | Naidoo et al. |
| 7,023,453 B2 | 4/2006 | Wilkinson |
| 7,038,710 B2 | 5/2006 | Caviedes |
| 7,136,605 B2 | 11/2006 | Tsunoda et al. |
| 7,203,620 B2 | 4/2007 | Li |
| 7,209,035 B2 | 4/2007 | Tabankin et al. |
| 7,218,756 B2 | 5/2007 | Garoutte |
| 7,239,311 B2 | 7/2007 | Dunn et al. |
| 7,262,690 B2 | 8/2007 | Heaton et al. |
| 7,342,489 B1 | 3/2008 | Milinusic et al. |
| 7,403,116 B2 | 7/2008 | Bittner |
| 7,423,667 B2 | 9/2008 | Hayasaka |
| 7,440,589 B2 | 10/2008 | Garoutte |
| 7,474,759 B2 | 1/2009 | Sternberg et al. |
| 7,486,183 B2 | 2/2009 | Luebke et al. |
| 7,612,666 B2 | 11/2009 | Badawy |
| 7,643,653 B2 | 1/2010 | Garoutte |
| 7,822,224 B2 | 10/2010 | Garoutte |
| 8,285,046 B2 * | 10/2012 | Cobb et al. ............ 382/173 |
| 8,345,923 B2 | 1/2013 | Garoutte |
| 2001/0010731 A1 | 8/2001 | Miyatake et al. |
| 2001/0033330 A1 | 10/2001 | Garoutte |
| 2001/0046309 A1 | 11/2001 | Kamei |
| 2003/0023910 A1 | 1/2003 | Myler et al. |
| 2003/0068100 A1 | 4/2003 | Covell et al. |
| 2003/0081836 A1 | 5/2003 | Averbuch et al. |
| 2003/0112333 A1 | 6/2003 | Chen et al. |
| 2003/0165193 A1 | 9/2003 | Chen et al. |
| 2003/0174212 A1 | 9/2003 | Ferguson |
| 2003/0219157 A1 | 11/2003 | Koide et al. |
| 2003/0228056 A1 | 12/2003 | Prakash et al. |
| 2004/0080623 A1 | 4/2004 | Cleveland et al. |
| 2004/0119848 A1 | 6/2004 | Beuhler |
| 2004/0184667 A1 | 9/2004 | Raskar et al. |
| 2004/0184677 A1 | 9/2004 | Raskar et al. |
| 2004/0190633 A1 | 9/2004 | Ali et al. |
| 2005/0089194 A1 | 4/2005 | Bell |
| 2005/0132414 A1 | 6/2005 | Bentley et al. |
| 2005/0134450 A1 | 6/2005 | Kovach |
| 2005/0146605 A1 | 7/2005 | Lipton et al. |
| 2005/0213815 A1 | 9/2005 | Garoutte |
| 2005/0219362 A1 | 10/2005 | Garoutte |
| 2006/0083440 A1 | 4/2006 | Chen et al. |
| 2006/0126933 A1 | 6/2006 | Porikli |
| 2006/0167595 A1 | 7/2006 | Breed et al. |
| 2006/0195569 A1 | 8/2006 | Barker |
| 2006/0221181 A1 | 10/2006 | Garoutte |
| 2006/0222206 A1 | 10/2006 | Garoutte |
| 2006/0290706 A1 | 12/2006 | Garoutte |
| 2007/0094716 A1 | 4/2007 | Farino et al. |
| 2007/0147699 A1 | 6/2007 | Loce et al. |
| 2007/0177800 A1 | 8/2007 | Connell |
| 2007/0262857 A1 | 11/2007 | Jackson |
| 2007/0263899 A1 | 11/2007 | Garoutte |
| 2007/0263905 A1 | 11/2007 | Chang et al. |
| 2009/0022362 A1 * | 1/2009 | Gagvani et al. ............ 382/100 |
| 2009/0141939 A1 | 6/2009 | Chambers et al. |
| 2010/0074472 A1 | 3/2010 | Garoutte |
| 2010/0290710 A1 | 11/2010 | Gagvani et al. |
| 2013/0293708 A1 | 11/2013 | Garoutte |

FOREIGN PATENT DOCUMENTS

| | | |
|---|---|---|
| JP | 06-102335 | 4/1994 |
| JP | 01-212118 | 8/2001 |

(56) References Cited

FOREIGN PATENT DOCUMENTS

| | | |
|---|---|---|
| JP | 2003-346160 | 12/2003 |
| WO | WO 98/19450 | 5/1998 |
| WO | WO 98/28706 | 7/1998 |
| WO | WO 98/47118 | 10/1998 |
| WO | WO 98/56182 | 12/1998 |
| WO | WO 99/05867 | 2/1999 |
| WO | WO 00/01140 | 1/2000 |
| WO | WO 01/57787 | 8/2001 |
| WO | WO 2005/096215 | 10/2005 |
| WO | WO 2007/002382 | 1/2007 |

OTHER PUBLICATIONS

International Search Report and Written Opinion for International Application No. PCT/US2008/070134, mailed Oct. 7, 2008.
Office Action for U.S. Appl. No. 11/803,851, mailed Aug. 4, 2010.
International Search Report and Written Opinion for International Application No. PCT/US2010/032013, mailed Jun. 28, 2010.
Bourgeat, P. et al., "Content-based segmentation of patterned wafer for automatic threshold determination," Proceedings of the SPIE—The International Society for Optical Engineering, 5011:183-189 (2003), (published before this application Apr. 2009).
Cheung, S-C. S. et al., "Robust Techniques for Background Substraction in Urban Traffic Video," Research paper, 12 pages, Center for Applied scientific Computing, Lawrence Livermore National Laboratory, Livermore, California USA (2004), (published before this application Apr. 2009).
Cucchiara, R. et al., "Detecting Moving Objects, Ghosts and Shadows in Video Streams," IEEE Transactions on Pattern Analysis and Machine Intelligence, 25(10):1337-1342 (2003), (published before this application Apr. 2009).
Forsyth, D. A. et al., "Computer Vision: A Modern Approach."
Garoutte, M. V., Terrain Map, An Image Space for Machine Vision. Spiral bound "white paper." Aug. 24, 2004, Revision 1.0.
Gavrila, D. M., "The Visual Analysis of Human Movements: A Survey," Computer Vision and Image Understanding, 73(1):82-98 (1999), (published before this application Apr. 2009).
Gibson, L. et al., "Vectorization of raster images using hierarchical methods," Computer Graphics and Image Processing, 20(1):82-89 (1982), (published before this application Apr. 2009).
Haritaoglu et al., "W4: Real-Time Surveillance of People and Their Activities," IEEE Transactions on Pattern Analysis and Machine Intelligence, 22(8):809-830 (2000), (published before this application Apr. 2009).
Schmid, C., "Weakly Supervised Learning of Visual Models and Its Application to Content-Based Retrieval," International Journal of Computer Vision, 56(1/2):7-16 (2004), (published before this application Apr. 2009).
Stefano et al., "A Charge-Detection algorithm Based on Structure and Colour," Proceedings of the IEEE Conference on Adanced Video and Signal Based Surveillance, 7 pages (2003), (published before this application Apr. 2009).
Zhao, T. et al., "Bayesian human segmentation in crowded situations," Proceedings of the 2003 IEEE Computer Society Conference on Computer Vision and Pattern Recognition (CVPR'03), Jun. 18-20, 2003, Madison, Wisconsin; [Proceedings of the IEEE Computer Conference on Computer Vision and Pattern Recognition], Los Alamitos, CA, vol. 2, pp. 459-466 (2003).
Zivkovic, Z., "Improved Adaptive Gaussian Mixture Model for Background Subtraction," International Conference Pattern Recognition, UK, (2004), (published before this application Apr. 2009).
Zivkovic, Z. et al., "Efficient Adaptive Density Estimation per Image Pixel for the Task of Background Subtraction," Pattern Recognition Letters, 27(7):773-780 (2006), (published before this application Apr. 2009).
Website Information, MTeye Wireless Video Verification and Remote Viewing Solutions, May 4, 2007, http://mteye.co.il/home/index.aspx.
Website Information, Videofied, May 14, 2007, http://www.videofied.com/en/What_is_Videofied/.
Website Information, The iControl Solution, iControl Networks, May 14, 2007, http://www.icontrol.com/how/WorksMain.jsp.
Website Information, Swann Alert DVR Camera Kit, May 14, 2007, http://www.costco.com/Browse//Product.aspx?Prodid=11206961&whse=BC&topnav=&browse=.
Website Information, Q-See 16 CH MPEG4 DVR 250 GB HDD with Built-in DVD Burner, May 14, 2007, http://www.costco.com/Browse/Product.aspx?Prodid=11200471&whse=BC&topnav=&browse=.

* cited by examiner

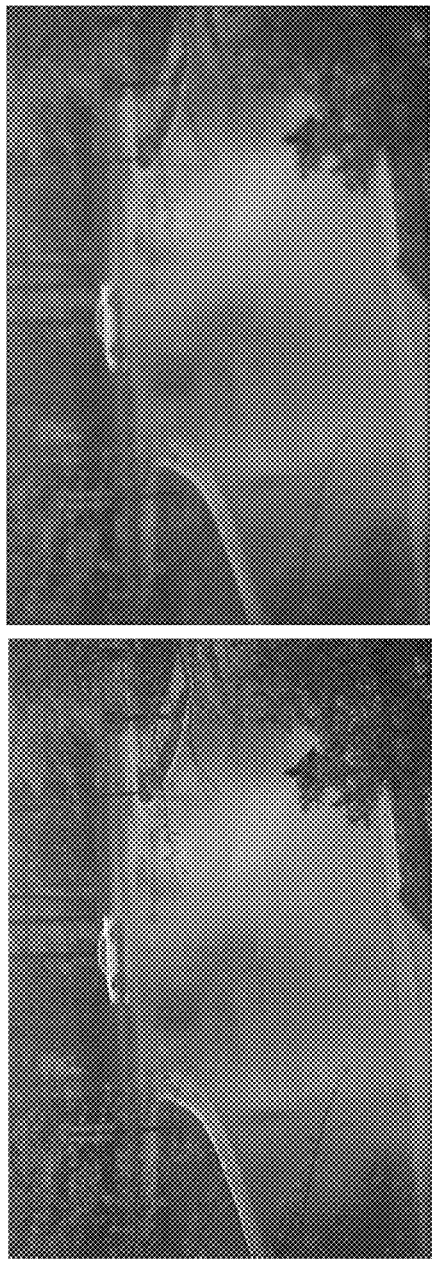
FIG. 3B
FIG. 4B
FIG. 3A
FIG. 4A

SYSTEM AND METHOD FOR MOTION DETECTION IN A SURVEILLANCE VIDEO

CROSS-REFERENCE TO RELATED APPLICATION

This application is a divisional of U.S. patent application Ser. No. 12/765,199, filed Apr. 22, 2010, and entitled "System and Method for Motion Detection in a Surveillance Video," which claims priority to and the benefit of U.S. Provisional Patent Application Ser. No. 61/171,710, filed Apr. 22, 2009, and entitled "System and Method for Motion Detection in a Surveillance Video," all of which are incorporated herein by reference in their entirety.

BACKGROUND

Disclosed embodiments relate to video monitoring and interpretation by software-aided methodology, and more particularly, to a system and method for improving the utility of video images in systems handling video, such as, for example, for system-interpreted analysis of video images for security purposes.

Video analytics is an industry term for the automated extraction of information from video. Video analytic systems can include a combination of imaging, computer vision and/or machine intelligence applied to real-world problems. Its utility spans several industry segments including video surveillance, retail, and automation. Video analytics is distinct from machine vision, machine inspection, and automotive vision. Known applications of video analytics can include, for example, detecting suspicious objects and activities for improved security, license plate recognition, traffic analysis for intelligent transportation systems, and customer counting and queue management for retail applications. Advantages of automated video surveillance systems include increased effectiveness and lower cost compared to human-operated systems.

Some known surveillance systems can accurately detect changes in a scene. Changes in a scene lead to changes of pixel values in a camera image. Scene changes can be induced by global or local illumination changes (e.g. sun light, car headlights, street lights), by environmental motion (e.g. blowing debris, shaking trees, running water), or by moving objects (e.g. moving people, cars, and pets). One of the challenging tasks of a surveillance system is to discriminate changes caused by moving objects from illumination changes.

Changes in pixel values for a given image can be computed relative to pixel values in a reference image of the same scene. A reference image, which can be referred to as a background image, generally depicts motionless objects (e.g. buildings, trees, light posts, roads, and parked cars) in a scene. To discriminate changes caused by illumination and environmental conditions (also called clutter motion) from changes caused by moving foreground objects of interest (e.g., moving objects), one known technique assumes that a small pixel and/or illumination change in an image corresponds to static objects, and a large pixel and/or illumination change in an image corresponds to moving objects. A pixel and/or illumination difference threshold can be used to differentiate static objects from moving objects. In a given scene, pixel differences below a threshold can be classified as static objects and pixel differences above the threshold can be classified as moving objects. Defining a threshold that accurately separates moving objects from clutter and background motion can be difficult. The more accurate the threshold, the greater the number of pixels corresponding to moving objects can be detected. Such an assumption is often violated by drastic and/or non-uniform illumination changes, such as regions of brightness and regions having shadows resulting from, for example, headlights or clouds, respectively. Pixel differences associated with such regions can be large, and thus, the regions are classified as moving objects rather than background. In addition to illumination change, large pixel differences can be associated with clutter motion (e.g. moving leaves, moving water, fountains). Pixels corresponding to clutter motion often do not correspond to objects of surveillance interest. As such, it is desirable to exclude such regions from the moving object detection.

Known systems can group pixels corresponding to moving objects into blobs for analysis. During blob analysis, some blobs can be rejected from consideration as moving objects while other blobs can be passed to high level post processing (e.g. recognition, classification). By employing moving object detection, a surveillance system reacts immediately with a lesser chance for a false alarm (i.e. the surveillance system almost instantly detects a moving object and quickly analyzes its behavior).

FIG. 1 illustrates the flow of moving object detection. Collectively, these steps can be referred to as background subtraction or background maintenance. The initial step can be to build a background image, representing an observed scene (e.g. by acquiring a frame of video input), at 100. This step can be performed at startup. Steps 2-4 can be repeated for each subsequent frame. The second step, for each "current" frame, can be to determine illumination differences between the current scene image and the background image (e.g., compute a background difference image), at 105. The third step can be to filter out noise (e.g., illumination changes due to static objects) in the background difference image using a pixel difference threshold, at 110. The pixels can then be grouped into blobs, at 115, and the blobs analyzed, at 120. The background image can be updated with objects that are deemed to be part of the background. Each step includes algorithms of different complexity, and the performance of moving object detection is dependent on the performance of such algorithms. The ultimate goal of a background subtraction algorithm is to provide accurate moving object detection while maintaining a low rate of false alarms from clutter or illumination changes.

The performance of the background subtraction algorithm can bound the performance and capabilities of a surveillance system because downstream processing such as recognition and classification depend on the quality and accuracy of blobs. Therefore, there is a constant demand for improving the performance of the background subtraction algorithm. Background subtraction is a key step for moving object detection in the presence of either static or dynamic backgrounds. To understand what occurs in a scene, the background subtraction algorithm can be used jointly with object tracking, recognition, classification, behavior analysis, and statistical data collection. Background subtraction is suitable for any application in which background removal is a guide for both reducing the search space and detecting regions of interest for further processing.

Many known approaches to background subtraction include modeling the color value of each background pixel by a Gaussian $I(x, y) \approx N(\mu(x, y), \Sigma(x, y))$ The parameters of the Gaussian distribution are determined from a sequence of consecutive frames. Once the background model is built, a likelihood function is used to decide whether a pixel value of a current frame corresponds to the Gaussian model, $N(\mu(x, y), \Sigma(x,y))$.

Another approach uses a mixture of Gaussians to model color pixel values in outdoor scenes. Another approach uses not only color information but spatial information as well. That is, each pixel of a current frame is matched to both the corresponding pixel in the background image and pixels neighboring the corresponding pixel. Another approach uses a three-component system: the first component predicts pixel value in a current frame, the second component fills in homogeneous regions of foreground objects, and the third component detects sudden global changes. Yet another approach aggregates the color and texture information for small image blocks.

Existing techniques use a mathematical model for the background or foreground blobs using scene statistics. However, they fail to address some challenges that occur in real-world usage. In many scenes, the assumption that a pixel value can be modeled by a Gaussian distribution is only true part of the time, which makes it difficult to build a robust algorithm. Additionally, the temporal updating of the background image or model is an unsolved issue that can instantly and drastically decrease the performance of the whole system. Accordingly, improvement is still required to complement existing algorithms. Some drawbacks of various known approaches are identified below in connection with real-world situations.

Pixel Difference Thresholding

The illumination of outdoor scenes cannot easily be controlled. Accordingly, the pixel difference between an image and its corresponding background image cannot be modeled robustly (i.e. the values of the background image can fluctuate drastically, chaotically and non-uniformly). Shadows, glares, reflections and the nature of object surfaces are examples of factors that can cause unpredictable behavior of pixel values and, as such, the pixel difference. Observing that pixel differences corresponding to groups of pixels behave more predictably and/or less chaotically, models were developed to calculate pixel differences by considering groups of pixels around a particular pixel. Such models assume that a pixel difference calculated using spatially close pixels behave more predictably than differences calculated using individual pixels. Although spatial modeling of a pixel difference provides some improvement, clutter motion (e.g., moving leaves on trees) remains a problem when values of the grouped pixels change both simultaneously and unpredictably. As a consequence, clutter motion regions can be identified as moving objects and can cause a surveillance system to generate false alarms.

Clutter Motion

One known solution for eliminating illumination changes caused by clutter motion regions is based on complex modeling of a background image. Multiple models, rather than a single model, can be used. Complex modeling assumes that the pixel value may fluctuate around several average values. Theoretically, the assumption is quite valid and indeed imitates real life scenarios. One or more thresholds can be applied to the difference between current and average pixel values. However, complex modeling can be sensitive to weather conditions (e.g. snow, rain, wind gusts), and the required processing power makes its implementation impractical due to the need for continuous moving object detection at a high frame rate. Complex modeling relies on continuous moving object detection and the accurate updating of individual models, which depends on the natural environment and specifics of the surveillance scene. Accordingly, statistics of a pixel model of the background image are updated after each input frame has been processed. An error in updating the background image or model directly affects the pixel difference threshold, and problems related to illumination change can accordingly reappear. One solution is to manually mask out the clutter motion regions, which results in the system failing to detect objects in the masked-out regions. However, artifacts of video compression (e.g., blockiness and ringing) can raise problems similar to those caused by clutter motion regions. Hence, manual masking is frequently not an acceptable solution.

Choosing a Threshold

Applying thresholds to pixel differences between an image and a corresponding background discards pixels assumed to be in the background. Once the pixels are discarded from the process (i.e., pixels are classified as background pixels), it can be difficult to re-classify them as object pixels. Moreover, estimating and updating the threshold value can be difficult. In some systems, for example, thresholds depend on the specifics of the surveillance scene, and hence, require tuning during the installation phase. Additionally, different thresholds can be used for different parts of the scene. Such tuning increases the cost of installation without guaranteeing high performance in an uncontrolled outdoor environment. Tuning may require a human to manually re-tune the system under unpredictable weather conditions. The process of choosing thresholds is unpredictable and depends strongly on aspects of background modeling. In systems based on Gaussian modeling, the threshold is uniform and constant for the entire scene. However, in some outdoor scenes each pixel cannot be modeled and updated using the same parametric model.

There is therefore a need to improve the performance of background subtraction so that it is robust to global and local illumination change, clutter motion, and is able to reliably update the background image/model.

SUMMARY

A foreground object's motion can occlude edges corresponding to background objects and can induce motion of the edges corresponding to foreground objects. These edges provide strong cues for the detection of foreground objects. Human object perception analyzes object edges to determine the object's contour, location, size and three-dimensional (3D) orientation. Once the object contours are analyzed, inner object edges can be analyzed to assist in understanding the object's structure. Similar to human perception, a surveillance system can prioritize the analysis of an object's edges. As such, the surveillance system can analyze edge information first and then analyze the finer grained appearance inside the object boundaries.

The proposed approach utilizes techniques for non-linear weighting, edge detection and automatic threshold updating. Non-linear weighting facilitates the discrimination of pixel differences owing to illumination from changes induced by object motion. Edge detection is performed by a modified Laplacian of Gaussian filter, which preserves the strength of edges. Any edge detection algorithm that does not convert a grayscale (or color) image into a binary image but instead preserves the edge strength maybe used in the proposed approach. Such an edge detection algorithm can be used to localize motion in the image. Automatic threshold updating can keep the background current and can react quickly to localized illumination changes in both space and time.

Disclosed embodiments for moving object detection can include separating true and false moving object detections, edge detection, and the automatic updating of thresholds. In addition to Gaussian smoothing, disclosed embodiments can include automatic non-linear weighting of pixel differences. Non-linear weighting does not depend on the specifics of a surveillance scene. Additionally, non-linear weighting significantly separates pixel differences corresponding to static objects and pixel differences induced by moving objects. Benefits of non-linear weighting include suppressing noise with a large standard of deviation, simplifying the choice of threshold values, and allowing longer periods of time between the updating of pixel values of the background image. A standard technique, based on a Laplacian of Gaussian (LoG) filter to detect edges can be modified such that the strength of edges is preserved in a non-binary image. Non-linear weighting together with the modified edge detection technique can accurately discriminate edges of moving objects from edges induced by illumination change, clutter motion, and video compression artifacts. Further, two thresholds can be used for each edge image of pixel differences to increase the accuracy in moving object detection. These threshold values can be updated automatically. The threshold updating mechanism does not depend on specifics of a surveillance scene, time of day, or weather conditions and is directly controlled by a pixel difference. The edge detection of moving objects allows preservation of pixels corresponding to low illumination change and eliminates pixels corresponding to high illumination change.

BRIEF DESCRIPTION OF THE DRAWINGS

FIGS. 3A and 3B show a non-smoothed and smoothed image, respectively.

FIG. 4A shows a smoothed background image.

FIG. 4B shows a smoothed subsequent image of the same scene as in FIG. 4A.

DETAILED DESCRIPTION

Disclosed embodiments may be used in systems and schemes for video handling, motion segmentation, moving object detection, moving object classification, moving object recognition, analysis of changes in video or still images, understanding a surveillance scene or regions of interest in a video or sequence of still images, video synchronization based on detection of similar motion or changes in different videos or sequences of images. Disclosed embodiments may be used for improving the utility of video images in various kinds of systems that use video, such as, for example, systems-interpreted analysis of video images for security purposes, object detection, classification and recognition, analysis of changes in the video or still images, understanding surveillance scenes or regions of interest in video or sequences of images, video synchronization based on motion or detecting similar changes in video captured by different cameras. For example, in the PERCEPTRAK system, a video security system, video scenes can be captured and then segmented according to the presence of objects or subjects of interest, such as persons or vehicles.

As used herein, foreground objects can be any structure or any portion of a structure of a target of interest in a scene. In some embodiments, for example, a foreground object can be a human, an animal, a human-made good, a structure, a vehicle and/or the like.

Figure 1:
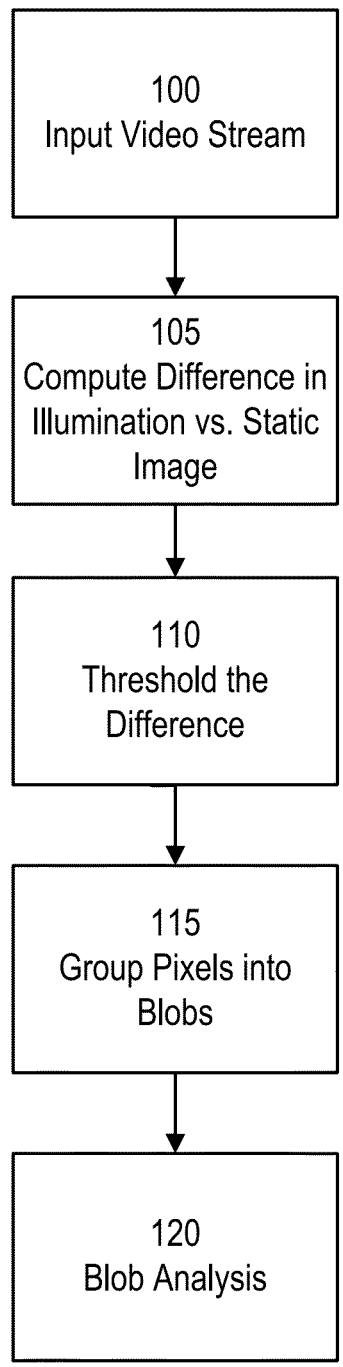
FIG. 1 is a flow chart illustrating the flow of moving object detection.
Figure 2:
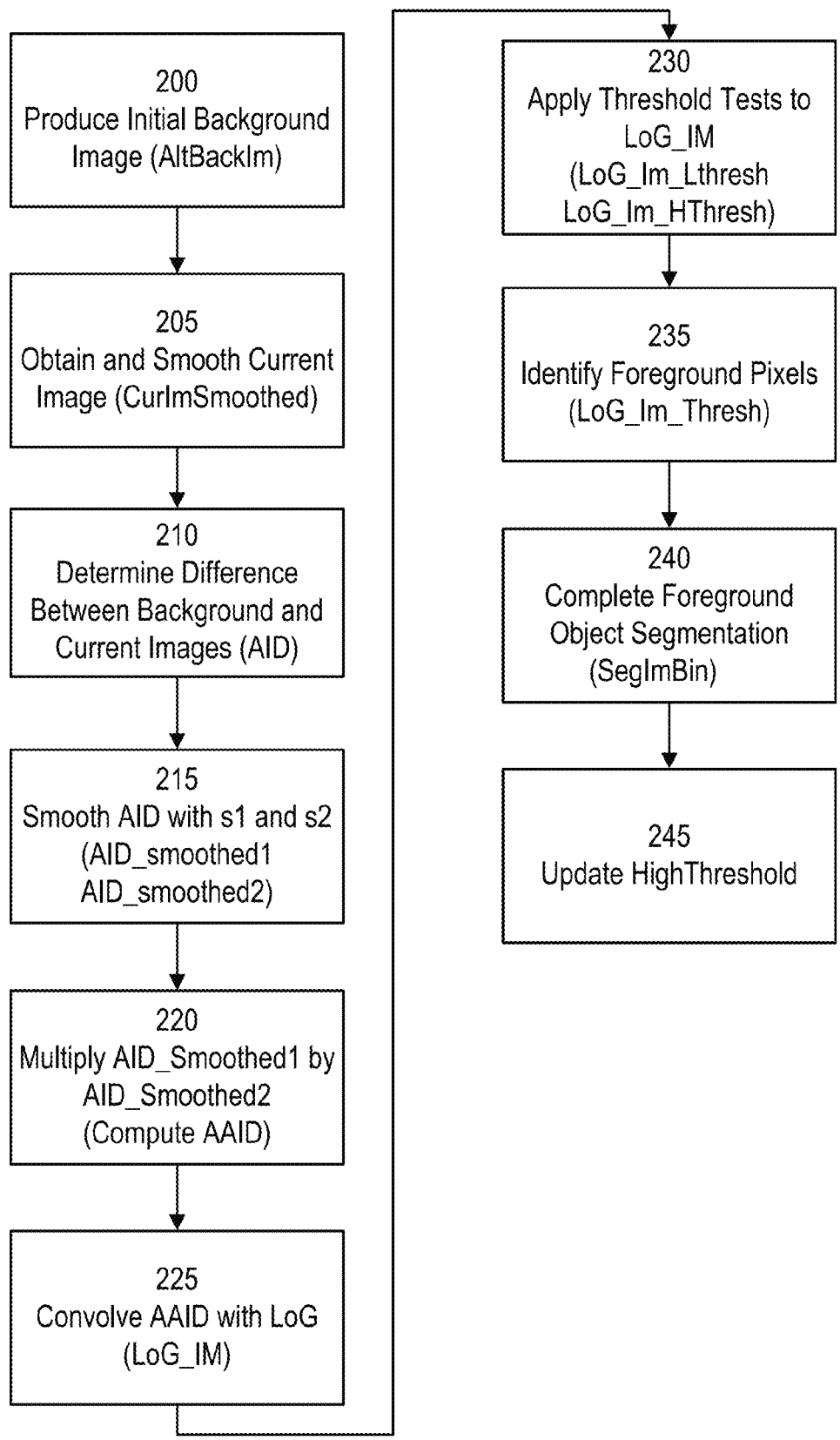
FIG. 2 is a flow chart illustrating a method for moving object detection, according to an embodiment.

FIG. 2 is a flow chart illustrating an embodiment of a moving object detection method. Steps 200 and 205 involve smoothing an image. Smoothing suppresses noise by enforcing the constraint that a pixel should look like its neighbors. Image smoothing is the process of replacing a pixel value with a weighted average value of its neighboring pixels. The Gaussian kernel is used as a model for smoothing noise caused by small illumination change. See e.g., D. A. Forsyth and J. Ponce, Computer Vision: A Modern Approach, the disclosure of which is incorporated herein by reference. The standard of deviation (sigma) of a Gaussian kernel controls the degree of smoothing. In some embodiments, an image can be smoothed with two Gaussian kernels of the same size with different values of the standard of deviation, sigma. In other embodiments, any other method to smooth the image can be used.

FIGS. 3A and 3B show a non-smoothed and smoothed image, respectively, with the sharpness of the smoothed image in FIG. 3B being less than the sharpness of the non-smoothed image in FIG. 3A. Image smoothing is also used in step 215, as described in further detail herein.

As shown in FIG. 2, the first step in the disclosed background subtraction method is to initialize the background. In step 200, an input frame is smoothed with a Gaussian kernel using an appropriate value for the standard of deviation (sigma), s1, to produce an initial background image, also referred to as the Altitude Background Image or AltBackIm. The image resolution can be either modified or preserved. In one embodiment, the very first frame is considered to be a background image. FIG. 4A shows an example of a smoothed background image, AltBackIm.

In step 205 a current frame or image is obtained and smoothed. The current frame can be smoothed with the Gaussian kernel with an appropriate value of sigma, s2. In some embodiments, the value of sigma s2 can be the same as the value of sigma s1. In other embodiments, sigma s2 can have a value different from the value of sigma s1. The smoothed image can be denoted as CurImSmoothed. An example of a smoothed current image is shown in FIG. 4B, which shows the same scene as in FIG. 4A, but includes a car moving through the scene.

Figure 5A:
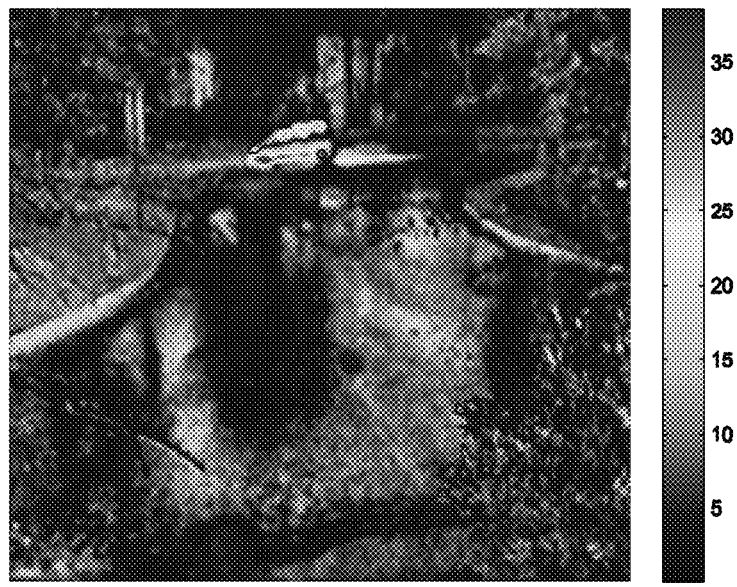
FIG. 5A illustrates an absolute Altitude Image Difference between the images of FIGS. 4A and 4B.
Figure 5B:
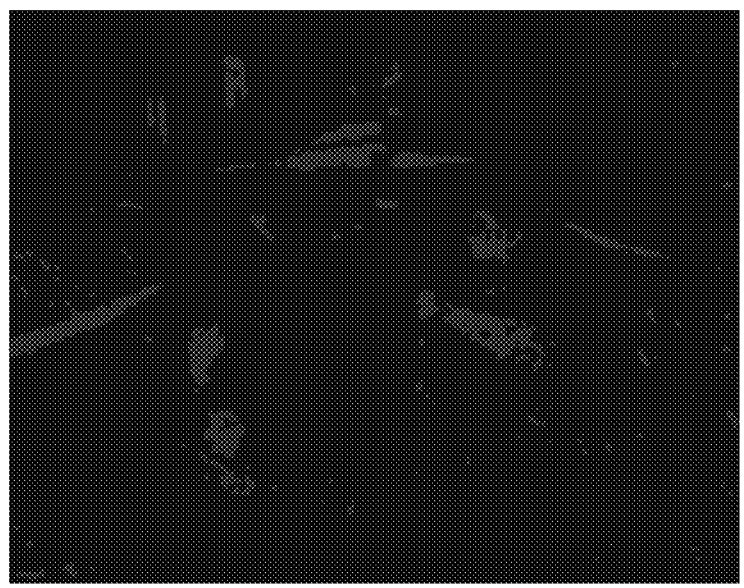
FIG. 5B illustrates the application of a universal threshold to the image of FIG. 5A.

Next, in step 210 of FIG. 2, the difference between the background image and the current image is calculated. Similarly stated, the value of each pixel in the background image is subtracted from the value of a corresponding pixel (i.e., a pixel in the same location and/or with the same coordinate value) in the current image. In some embodiments, this difference is an absolute Altitude Image Difference, or AID, between AltBackIm (e.g., FIG. 4A) and CurImSmoothed (e.g., FIG. 4B). An example of an AID, based on the images shown in FIGS. 4A and 4B, is shown in FIG. 5A. At this step, applying a threshold to the AID does not effectively differentiate true changes from false ones. Because the Euclidian distances between true and false differences are very small, it is difficult to separate true detections from false ones. This is illustrated in FIG. 5B, which shows foreground pixels after applying a fixed threshold to all pixels of the AID (FIG. 5A). Besides pixels corresponding to the moving car, some background pixels were also detected as foreground. Any resulting image of such algebraic operations, which include at least the algebraic difference between the background image and any given image, should be considered as one of the forms of AID contemplated by this disclosure.

Figure 6A:
FIGS. 6A and 6B show the image of FIG. 5A smoothed with a Gaussian kernel using two different values for sigma.
Figure 6B:

In step 215 of FIG. 2, the AID is smoothed with the Gaussian kernel using two different values for sigma, s3 and s4. In some embodiments, the value of sigma s3 and/or the value of sigma s4 can be the same as the value of sigma s1 and/or the value of sigma s2. In other embodiments, sigma s3 and/or sigma s4 can have a value different from the value of sigma s1 and/or the value of sigma s2. The resulting images are denoted as AID_smoothed1 and AID_smoothed2, respectively. In addition to spatial smoothing of the difference image, this step emulates temporal smoothing. In general, a real moving object corresponds to a blob in the background difference with relatively high pixel difference values distributed across the entire blob. In contrast, only a small portion of a falsely detected blob has relatively high pixel difference values. Smoothing the background difference disperses the noise of high pixel differences among neighboring pixels with lower values and reduces the false detection rate. Smoothing parameters control the blob contour and size of the blob to be detected. FIGS. 6A and 6B show the AID of FIG. 5A smoothed with s1 and s2, respectively, where s1 is less than s2. In other embodiments, any type of image smoothing can be used.

In step 220 of FIG. 2, the value of each pixel of the AID_smoothed1 is multiplied by the value of a corresponding pixel (i.e., a pixel in the same location and/or with the same coordinate value) of the AID_smoothed2. The product of the multiplication can be denoted as AAID, or Amplified Altitude Image Difference. The multiplication of AID_smoothed1 by AID_smoothed2 is an automatic non-linear weighting of the background image difference. Compared to the non-weighted AID, the Euclidian distances between true and false changes in AAID are non-linearly (e.g., exponentially) increased, and can therefore be easily separated. Such a non-linear weighting can be characterized by:

$$AAID(i,j) = AID\_smoothed\_1(i,j) * AID\_smoothed2(i,j),$$

where i and j are pixel coordinates.

In general, the AAID can be obtained using any non-linear function:

$$AAID(i,j) = f(AID(i,j)),$$

where $f$ is a non-linear function.

Computing the AAID transforms the AID into a different domain, in which the high background differences corresponding to false motion detections are better separated from high background differences corresponding to real objects. Although computing AID_smoothed1 and AID_smoothed2 improves the AAID, in other embodiments, the AAID image can be defined directly using values of the AID.

Figure 7A:
FIG. 7A shows an image produced by multiplying the pixel values of the images of FIGS. 5A and 6A.

FIG. 7A shows the AAID produced by the multiplication of the AID_smoothed1 of FIG. 6A and the AID_smoothed2 of FIG. 6B. As can be seen in FIG. 7A, the pixels corresponding to the moving car are very distinct from the dark background pixels. In other embodiments, any suitable approach can be used to calculate the AAID. For example, the AAID can be calculated by a) multiplying each pixel of the AID with a corresponding pixel of the AID_smoothed2 (or AID_smoothed1); b) applying a non-linear function, a combination of non-linear functions, or a combination of linear and non-linear functions to each pixel of the AID, transformed AID, or modified AID; and/or c) applying a linear/non-linear combination of the AID and transformed/modified AID.

Next, in step 225 of FIG. 2, the AAID is convolved with a Laplacian of Gaussian (LoG) kernel using an appropriate sigma. For each pixel, the zero crossings in all possible directions are first determined and then an absolute difference for each zero crossing is calculated. The differences can be summed and stored as a pixel value in an image denoted LoG_Im. In contrast to known Laplacian of Gaussian-based edge detectors, in which zero crossings are converted into binary values (i.e. a zero or one), in the disclosed embodiment, the values corresponding to zero crossings are preserved (i.e. the edge strength is preserved) to define a non-binary edge image. Accordingly, various edge detection techniques can be applied at this stage to define the non-binary edge image. Using non-binary edge detection assists the transformation of the AID from the AAID into the LoG_Im, in which threshold tests can be applied to edge strength. In some embodiments, there is no need to associate the edges in LoG_Im and the edges in AltBackIm to filter out the weak edges. Moreover, in some embodiments, no association or difference between the edges in LoG_Im and the edges in AltBackIm is used to detect and/or remove constant change in the background (clutter motion), detect moving objects during non-global illumination changes and/or during a relatively long interval between background updates. Accordingly, in such embodiments, the edges need not be detected in the background or reference images (e.g., AltBackIm). The LoG_Im can be stored in a DeltaDif buffer, which contains the last frames of LoG_Im (NumDifFrames). The size of the DeltaDif buffer can be defined by the availability of memory.

The DeltaDif buffer can also be used in updating a threshold in step 245, as described in further detail herein. In some embodiments, the background can be updated during a period of little activity when the system has a high confidence that the pixels are background pixels. Such background updating can be a higher priority task than an immediate reaction to a background change.

In other embodiments, any other edge detection method, which does not produce a resulting binary image, applied to non-linearly weighted image can be used instead of a Laplacian of Gaussian-based edge detector.

Figure 8:
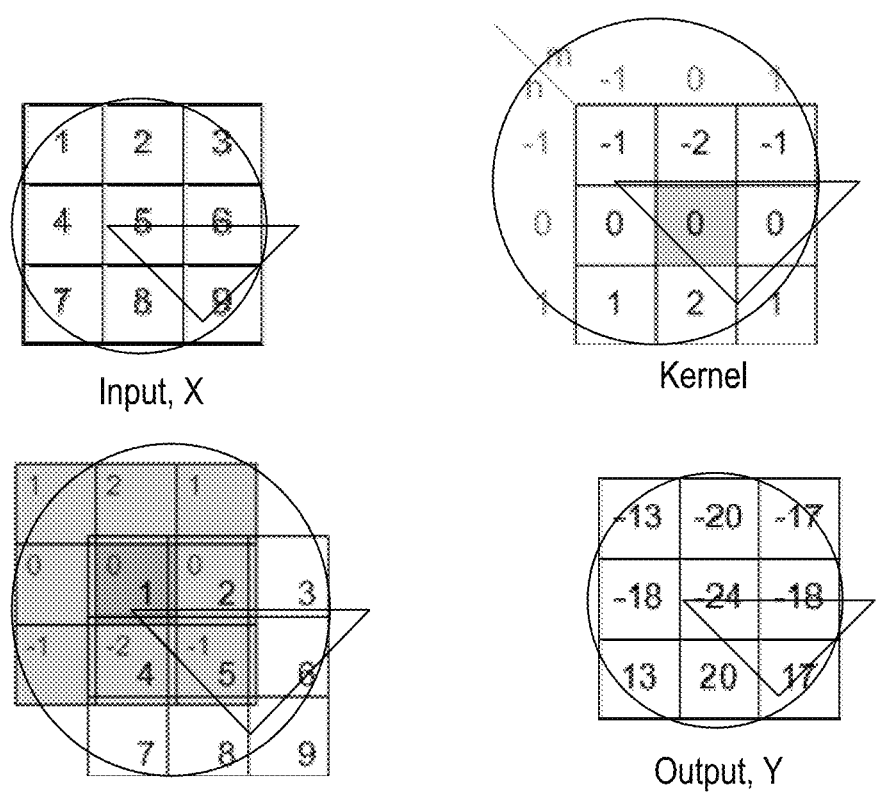
FIG. 8 illustrates a convolution using a Laplacian of Gaussian kernel.

An example of the convolution of step 225 is illustrated in FIG. 8. The input, X, is a 9 pixel region. The kernel is applied to produce the 9 pixel output, Y. The calculation of the value of the [0,0] pixel of the output Y is shown in Equation 1, below.

$$y[0, 0] = x[-1, -1] * h[1, 1] + x[0, -1] * h[0, 1] + \qquad \text{Equation 1}$$
$$x[1, -1] * h[-1, 1] + x[-1, 0] * h[1, 0] +$$

$$x[0, 0] * h[0, 0] + x[1, 0] * h[-1, 0] +$$
$$x[-1, 1] * h[1, -1] + x[0, 1] * h[0, -1] +$$
$$x[1, 1] * h[-1, -1]$$
$$= 0 * 1 + 0 * 2 + 0 * 1 + 0 * 0 + 1 * 0 + 2 * 0 + 0 *$$
$$(-1) + 4 * (-2) + 5 * (-1)$$
$$= -13$$

Figure 7B:
FIG. 7B shows an image produced by convolution of the image of FIG. 7A using a Laplacian of Gaussian kernel.

An example of the effect of the convolution is shown in FIG. 7B, in which the LoG convolution is applied to the image of FIG. 7A. As can be seen in FIG. 7B, sharp edges correspond to moving objects, while edges corresponding to the water spray cloud behind the car are much less sharp.

Figure 9A:
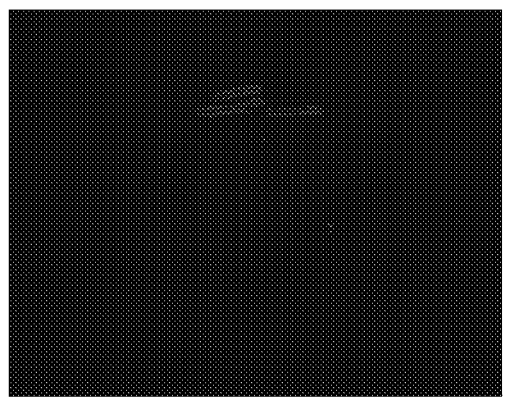
FIGS. 9A and 9B show images produced by the application of a low threshold and a high threshold, respectively, to the image of FIG. 7B.

In general, real moving objects define long, solid, bold and/or strong edges, while false detections define short, dashed, and/or weak edges (see e.g., FIG. 9A). A real moving object defines strong connected and non-connected edges in LoG_Im. The number of pixels corresponding to the strong edges and used in the object detection, controls the detection sensitivity and can vary based on the application. To filter out weak edges, low and high threshold tests can be applied to LoG_Im, at 230.

Figure 9B:
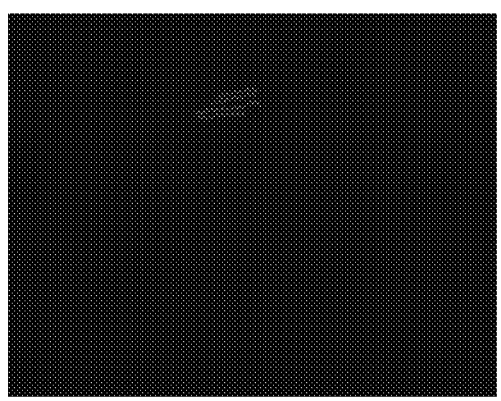

The low threshold, LowThreshold, preserves the true changes in the background but does not eliminate all false deviations. The high threshold, HighThreshold, also preserves the true changes while completely or significantly eliminating false changes. Pixels that pass the high threshold test indicate true foreground blobs that also passed the low threshold test. The pixels passed through LowThreshold are stored in LoG_Im_LThresh, and pixels passed through HighThreshold are stored in LoG_Im_HThresh. Similarly stated, pixels having a value greater than or equal to HighThreshold are stored in LoG_Im_HThresh while pixels having a value less than HighThreshold are not stored in LoG_Im_HThresh (e.g., their pixel locations are set to zero). Pixels having a value less than HighThreshold can be said to be removed from LoG_Im_HThresh. Similarly, pixels having a value greater than or equal to LowThreshold are stored in LoG_Im_LThresh while pixels having a value less than LowThreshold are not stored in LoG_Im_LThresh (e.g., their pixel locations are set to zero). Pixels having a value less than LowThreshold can be said to be removed from LoG_Im_LThresh. This two-component step removes noise in moving object detections. An example of the effect of the thresholding is illustrated in FIGS. 9A and 9B, in which the low threshold and the high threshold, respectively, are applied to the LoG_IM image of FIG. 7B. FIG. 9B depicts edges corresponding to moving objects while eliminating edges corresponding to the water cloud.

Next, in step 235 of FIG. 2, foreground pixels are identified by comparing the pixel values at pixel locations in LoG_Im_HThresh with the pixel values at corresponding pixel locations (i.e., a pixel location in the same location and/or with the same coordinate value) in LoG_Im_LThresh. Initially, the pixel locations having values greater than zero in both LoG_Im_HThresh and LoG_Im_LThresh are classified as foreground pixels (e.g., are preserved). Similarly stated, each pixel location having a value greater than both the HighThreshold (i.e., pixel is stored in LoG_Im_HThresh) and the LowThreshold (i.e., pixel is stored in LoG_Im_HThresh) is classified as a foreground pixel.

Additionally, the value of any pixel connected and/or contiguous to the pixels in both LoG_Im_HThresh and LoG_Im_LThresh (i.e., those pixels initially classified as foreground pixels) are preserved. Similarly stated, if a pixel location is initially classified as a foreground pixel, any pixel within LoG_Im_LThresh and contiguous to the pixel location via at least one other pixel in LoG_Im_LThresh is classified as a foreground object. For example, if a pixel at a first pixel location having coordinates (row 1, column 1) is in both LoG_Im_HThresh and LoG_Im_LThresh (i.e., is initially classified as a foreground pixel), a pixel at a second pixel location having coordinates (row 1, column 4) and not in LoG_Im_HThresh but in LoG_Im_LThresh can be classified as a foreground object if a pixel at (row 1, column 2) and a pixel at (row 1, column 3) are both in LoG_Im_LThresh. The pixel at the second pixel location can be said to be contiguous and/or connected to the pixel at the first pixel location. In other embodiments, pixels in LoG_Im_LThresh but not in LoG_Im_HThresh within a given distance (e.g., a certain number of pixels) of a pixel in both LoG_Im_HThresh and LoG_Im_LThresh can be classified as foreground pixels even if they are not contiguous with the pixel in both LoG_Im_HThresh and LoG_Im_LThresh.

Figure 10A:
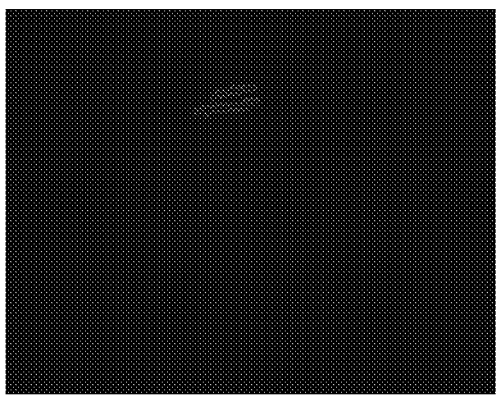
FIG. 10A shows an image produced by the combination of FIGS. 9A and 9B.

Connected and/or contiguous pixels in LoG_Im_LThresh and LoG_Im_HThresh can be grouped into blobs. Similarly stated, pixels from LoG_Im_HThresh vote for foreground blobs in LoG_Im_LThresh. Any blob in LoG_Im_LThresh, which has at least one vote (e.g., at least one pixel in LoG_Im_HThresh), will be preserved as a foreground blob. These foreground pixels create a new image, LoG_Im_Thresh. In other words, a single pixel in LoG_Im_HThresh is enough to classify an entire blob in LoG_Im_LThresh as a foreground blob. This is illustrated in FIG. 10A, based on the images of FIGS. 9A and 9B. This voting scheme can eliminate pixels corresponding to large illumination differences (e.g., changes their value to zero).

Figure 10B:
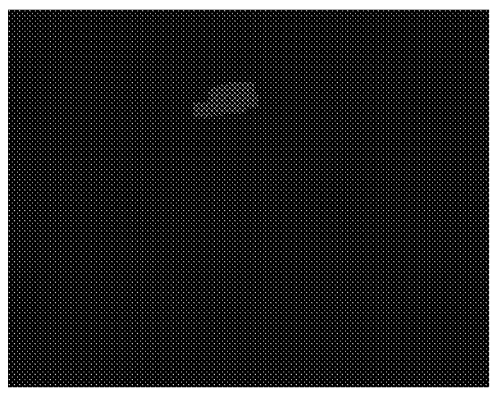
FIG. 10B shows an image produced by filling the blobs in the image of FIG. 10A.

Next, in step 240 of FIG. 2, foreground object segmentation is completed. The LoG_Im_Thresh image (FIG. 10A) stores the foreground blobs. The non-zero pixels in LoG_Im_Thresh indicate corresponding pixels in AID_smoothed2 (FIG. 6B) to be processed for filling in the foreground blobs. Each row of the indicated foreground blob in AID_smoothed2 is scanned to find a minimum value, LocalThresh. A pixel in that row is considered a foreground pixel if its value is greater than LocalThresh. LocalThresh is a dynamic value, and thus, provides sensitive detection of foreground pixels in AID_smoothed2 around corresponding foreground blobs in LoG_Im_Thresh (FIG. 10A) and low false alarm rate in the rest of AID_smoothed2. The resulting foreground pixels represent the final result of moving object segmentation, and the final foreground pixel segmentation is denoted as SegImBin. An example is shown in FIG. 10B, which is based on the LoG_Im_Thresh image of FIG. 10A.

In step 245 of FIG. 2, the HighThreshold value is updated. The sensitivity of moving object detection is determined by the HighThreshold, the value of which strongly depends on image brightness and the background difference of each pixel, see FIG. 11. Low contrast video and scene illumination require a lower value. For high quality moving object detection, HighThreshold cannot be fixed and must be adjusted for each pixel at each time instant. Once SegImBin (FIG. 10B) is computed, HighThreshold values for remaining pixels are updated using the following rules:

TmpVal[$i$][$j$]=max(InitialHighThresholdValue,
    adaptation_rate*AID_smoothed2[$i$][$j$])     Equation 2

HighThreshold=min(HighThreshold+HT_Delta,
    TmpVal[$i$][$j$],MaxHighThresholdValue)     Equation 3

For each pixel at index [i][j], a temporary value TmpVal[i][j] is computed based on Equation 2. InitialHighThresholdValue is a fixed number for all pixels, for all scenes and adaptation_rate is also a fixed value that controls the speed of change of the HighThreshold. A new HighThreshold is computed next by Equation 3, which is the minimum of three numbers. These are a) the current HighThreshold plus HT_Delta, where HT_Delta is the maximum allowed change to the HighThreshold per frame, b) TmpVal [i][j] computed earlier by Equation 2 and c) a fixed number MaxHighThresholdValue.

The value for MaxHighThreshold can be set sufficiently high such that no non-moving object will be detected. The above two rules gradually increase the value of HighThreshold, and immediately reset the value to InitialHighThresholdValue, if the pixel difference between the background image and the current image is below InitialHighThresholdValue. In other embodiments the HighThreshold value can be reset to InitialHighThresholdValue gradually over multiple frames. This step is automatic and expands the application of the disclosed method to different environmental conditions.

In other embodiments, both the LowThreshold and the HighThreshold can be updated. By updating both the LowThreshold and the HighThreshold at each input frame, less frequent background image updates can be used. In some embodiments, for example, the background image can be updated approximately every 2500 frames under non-global illumination change (rain, snow, moving tree branches, moving shadows, etc.) and every 10000 frames under smooth global illumination change under 30 frames per second (fps) video capturing speed. In such embodiments, no feedback from a high level post background difference processing module is used (e.g., tracking, scene learning and understanding, analyzing structure of the background scene, moving object classification, etc.). Accordingly, the method acts as a standalone background subtraction method.

Once SegImBin (FIG. 10B) is computed, a foreground binary mask, ForegroundMask, can be computed. In some embodiments, ForegroundMask is the same as SegImBin. In other embodiments, ForegroundMask is any binary image in which an area of a foreground blob is expanded and/or dilated. HiThreshCur and LoThreshCur are selectively updated for pixels, which are indicated as background pixels (e.g., zeros) in ForegroundMask. HistoryThreshUpdate is a counter of how many frames a pixel was detected as a background pixel (e.g., zero). If a pixel is detected as a foreground pixel (e.g., one), the pixel counter is reset to zero. If a pixel is detected as a background pixel for a number of predetermined frames (NumDifFrames) or more, then its HiThreshCur and LoThreshCur can be updated.

For each foreground pixel of SegImBin, the pixel counter of HistoryThreshUpdate is reset. Additionally, for each background pixel, the pixel counter of HistoryThreshUpdate is incremented by one or any other suitable amount. Pixels whose counter is greater than or equal to NumDifFrames are classified as BckgrAdjPixels. HistoryThreshUpdate directly controls a minimum waiting period (e.g., a number of frames, an amount of time, etc.) for maintaining confidence that a pixel should be classified as a background pixel.

For BckgrAdjPixels pixels, LoThreshBase and HiThreshBase are updated using the following equations:

LoThreshBase(BckgrAdjPixels)=median(DeltaDif(BckgrAdjPixels))+lo_delta     Equation 4

HiThreshBase(BckgrAdjPixels)=median(DeltaDif(BckgrAdjPixels))+hi_delta     Equation 5

LoThreshBase and HiThreshBase define the lowest possible values of LowThreshold and HighThreshold, respectively, at which noise can be separated from real moving objects. The LoThreshBase and HiThreshBase are the default values used for optimum detection of real moving objects. Further reducing these values can cause more noise and false detections.

For pixels whose values are in ForegroundMask, the current low and high threshold (LoThreshCur and HiThresholdCur), are set to the corresponding values in LoThreshBase and HiThreshBase, respectively. Thus, for a portion of the image in which a moving object was detected, the threshold values (LoThreshCur and HiThresholdCur) are reset to the base values (LoThreshBase and HiThreshBase) to provide optimum moving object segmentation.

For BckgrAdjPixels pixels, LoThreshCur and HiThreshCur can be updated using the following equations:

LoThreshCur(BckgrAdjPixels)=min(max(LoThreshCur(BckgrAdjPixels)−lo_delta_decr, DeltaDif(BckgrAdjPixels)+lo_delta_incr),MaxLoThresh(BckgrAdjPixels))     Equation 6

HiThreshCur(BckgrAdjPixels)=min(max(HiThreshCur(BckgrAdjPixels)−hi_delta_decr, max(DeltaDif(BckgrAdjPixels))+hi_delta_incr),MaxHiThresh(BckgrAdjPixels))     Equation 7

Accordingly, for pixels, detected as background pixels, the current threshold values are either increased or decreased, according to the current background image difference. Thus, rules gradually increase or decrease the current threshold values. Gradual increases and/or decreases of the low threshold are controlled by lo_delta_incr and lo_delta_decr, respectively. Similarly, gradual increases and/or decreases of the high threshold are controlled by hi_delta_incr and hi_delta_decr, respectively. MaxLoThresh and MaxHiThresh are maximum values for the LoThreshCur and HiThreshCur, respectively. Similarly stated, as depicted in Equations 6 and 7, LoThreshCur and HiThreshCur will not have values greater than MaxLoThresh and MaxHiThresh, respectively.

Figure 11A:
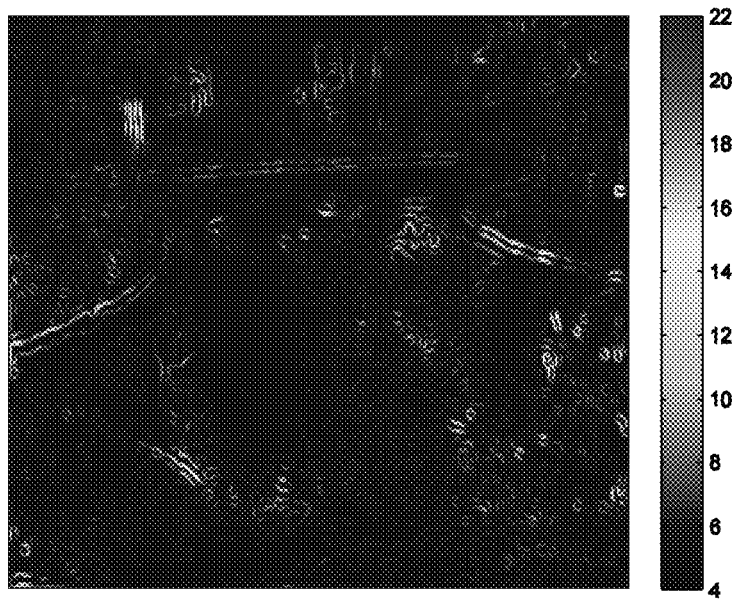
FIGS. 11A and 11B show values of an adaptive Current Low and High Threshold, respectively, for each pixel in an image.
Figure 11B:
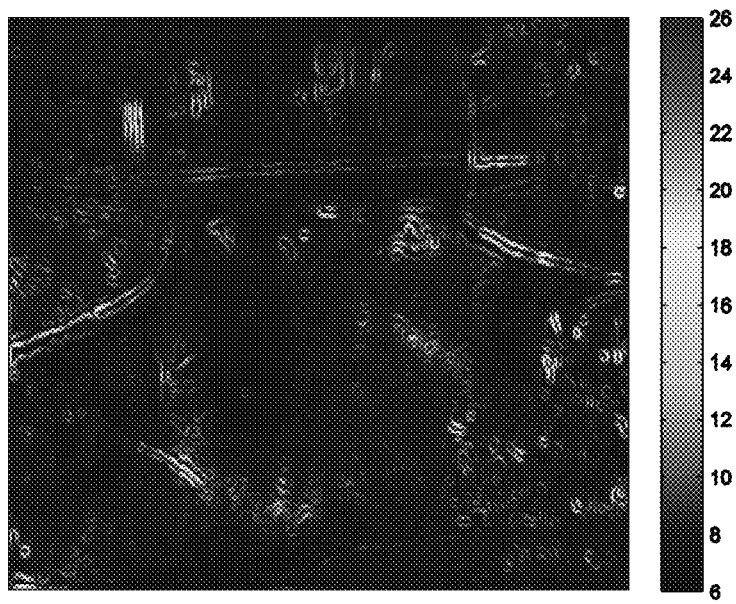
Figure 12A:
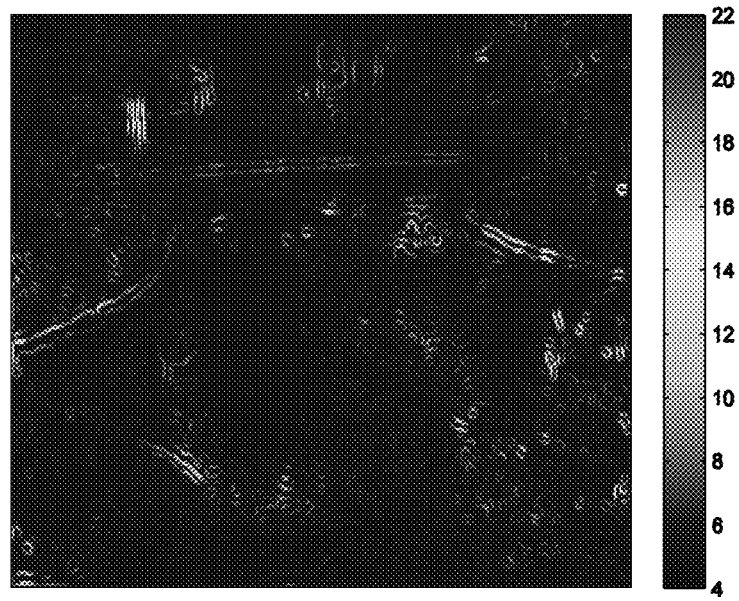
FIGS. 12A and 12B show values of an adaptive Base Low and High Threshold, respectively, for each pixel in an image.
Figure 12B:
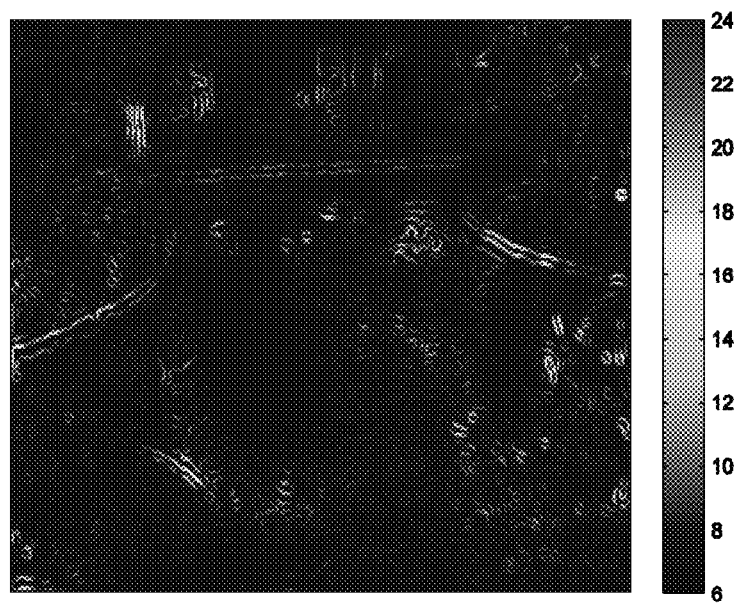

In some embodiments, updating the high threshold and low threshold is fully automatic and expands the application of the background subtraction method to various environmental conditions. The values of the low and high threshold depend on image brightness and background difference of each pixel. FIGS. 11A and 11B, for example, illustrate the current low and high threshold for a frame of an image with respect to a background image. FIGS. 12A and 12B show the base low and high values at the frame of the image.

EXAMPLES

The following examples illustrate the improved performance of the disclosed method as compared to the improved GMM (Gaussian Mixture Models) technique described in Z. Zivkovic, Improved adaptive Gaussian mixture model for background subtraction. International Conference Pattern Recognition, UK, August, 2004 and Z. Zivkovic and F. van der Heijden, Efficient Adaptive Density Estimation per Image Pixel for the Task of Background Subtraction. Pattern Recognition Letters, vol. 27, no. 7, pages 773-780, 2006, the disclosure of which is incorporated herein by reference.

The challenge presented by the examples below is to detect moving objects with a minimum number of false foreground detections under different illumination and weather conditions without any manual system tuning. In other words, for all tests, all parameters of both algorithms were fixed. Frequent updating of the background model in GMM reduces false foreground detection. However, the frequent updating causes holes inside of moving objects and makes it difficult to detect objects that remained in the scene. In the GMM method, a sharp and sudden change in the background is quickly dissolved into a new background but causes an increase in false foreground detections.

Four examples are illustrated, by FIGS. 13, 14, 15 and 16, respectively. In each figure, the first column (on the left) shows the original input frames; the second column shows the GMM results with white pixels corresponding to detected foreground pixels; the third column shows results by the method disclosed above with white pixels corresponding to detected foreground pixels; and the fourth column shows the adapted high threshold as a grayscale image, with brighter pixels indicating a higher value for HighThreshold In each example, the disclosed method performs better than the GMM method.

Example 1

Figure 13:
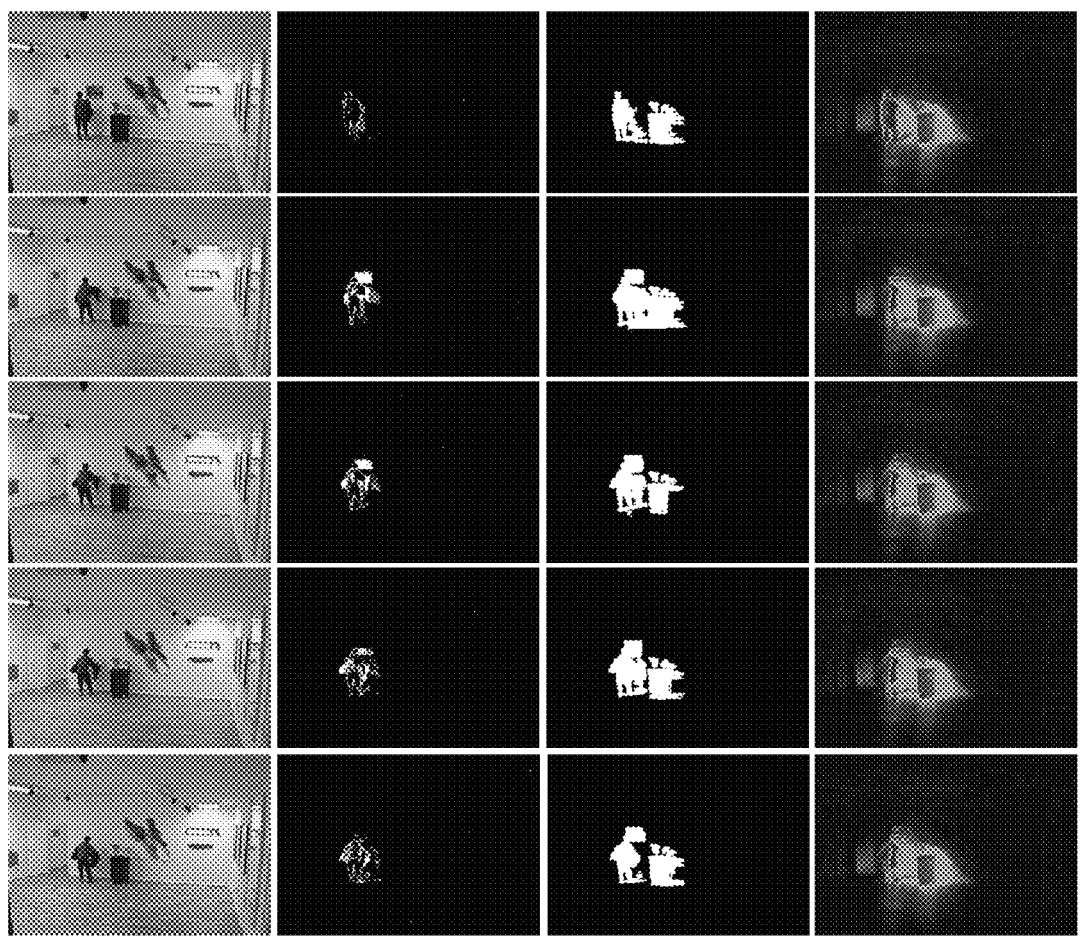
FIGS. 13-16 compare the application of the GMM method and a method according to a disclosed embodiment to four sets of images.

In the first example, illustrated in FIG. 13, a painting is removed from a wall, an event that is desired to be detected. The first, second, third, fourth and fifth rows show results corresponding to frames numbered 6600, 6684, 6687, 6690 and 6693, respectively. Using the GMM method, the trash bucket is merged with the background (column 2), and the absence of the painting is merged into the background (row 5, column 2). In contrast, the presence of trash bucket and the absence of the painting are preserved in the results using the disclosed method (column 3). The individual values of the high threshold preserve detection of foreground objects while eliminating shadows on the wall and floor.

Example 2

Figure 14:
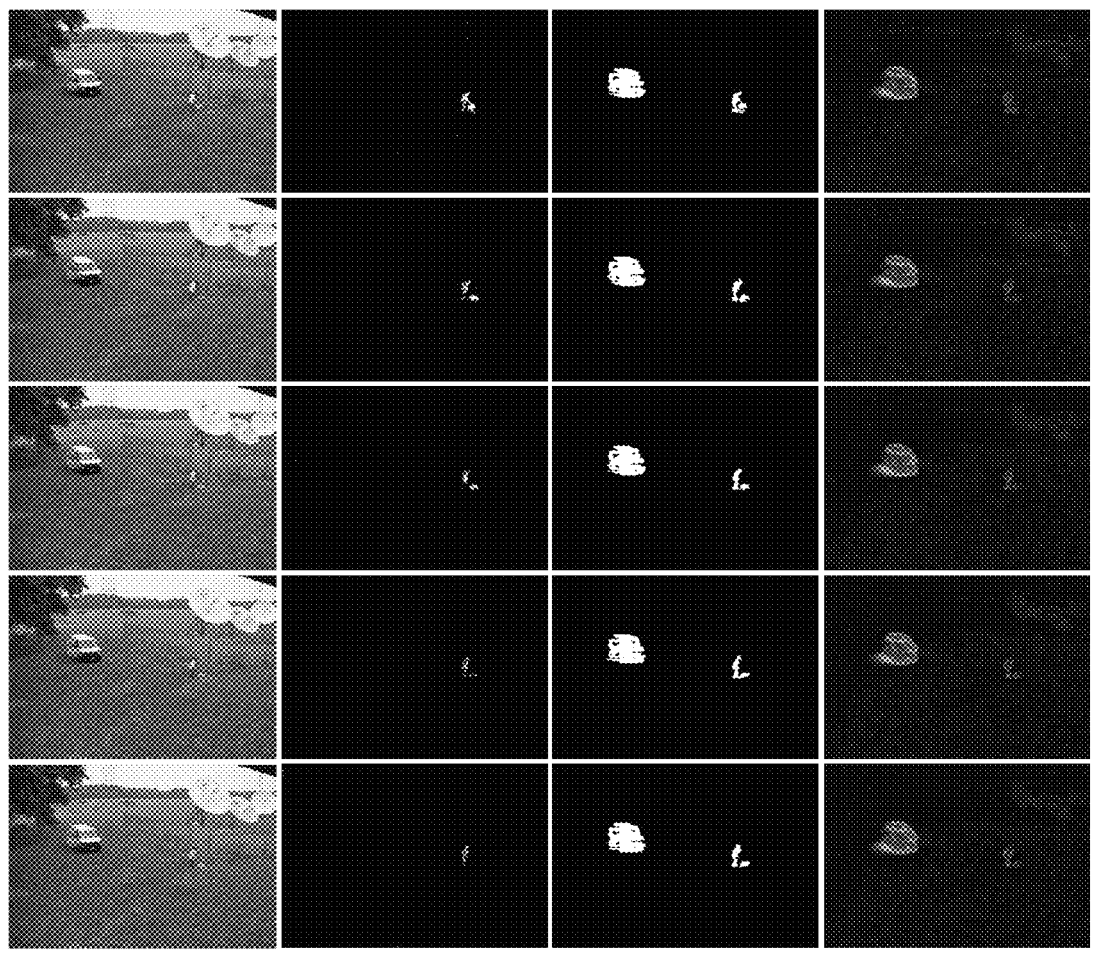

In the second example, illustrated in FIG. 14, a van approaches a region under surveillance. While the van is parked, a person leaves the van and drops a box on the ground. The first, second, third, fourth and fifth rows show results corresponding to frames numbered 5619, 5627, 5635, 5643 and 5649, respectively. Using the GMM algorithm, the van is merged with the background and is invisible in all frames in the second column GMM takes approximately 30 frames (1 second in real time) to merge a dropped box with the background model. In contrast to GMM, the disclosed method (column 3) preserved the parked van and the dropped box as foreground objects. The last column shows the different values of the high threshold computed continuously from frame 1. The bright satellite antennas caused large illumination noise (right top corner of the image), which are eliminated by the high adaptive threshold.

Example 3

Figure 15:
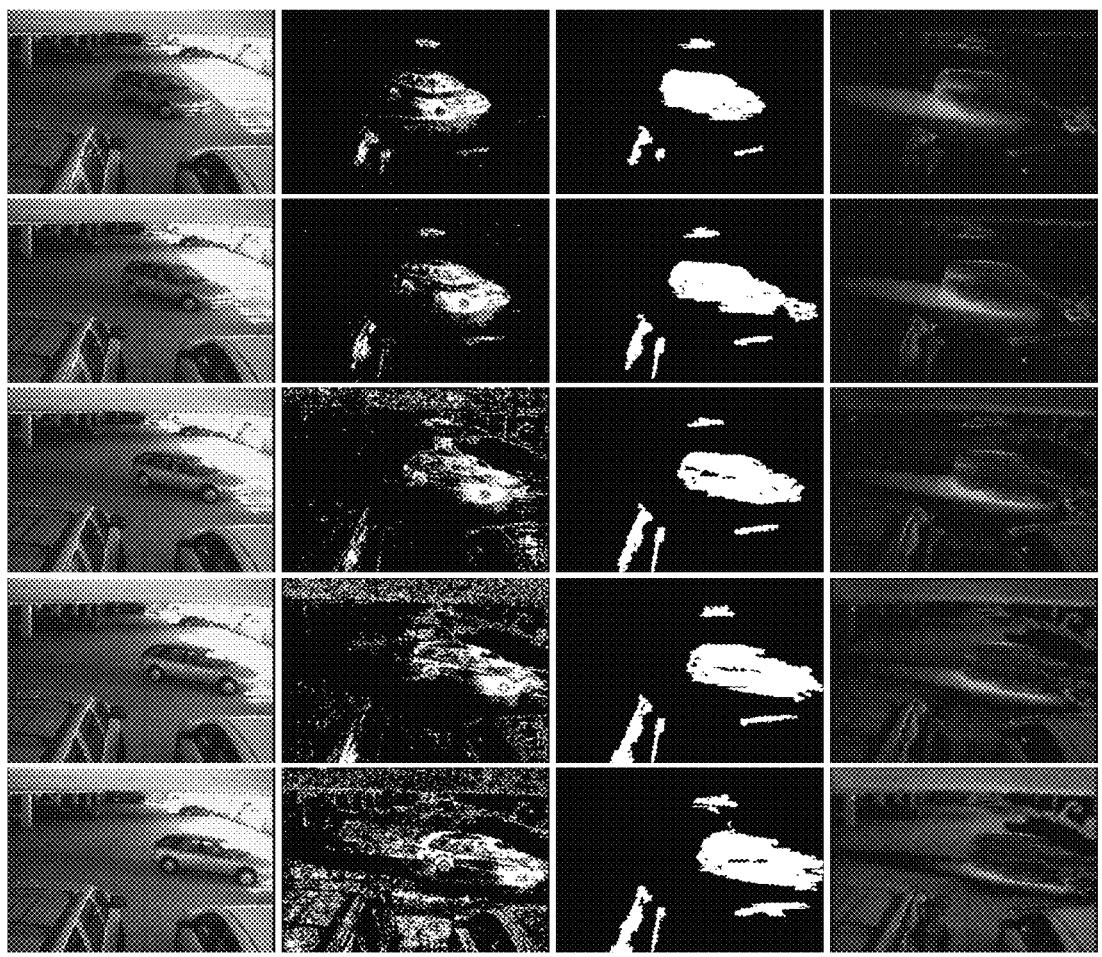

In the third example, illustrated in FIG. 15, a car moves towards the camera. The first, second, third, fourth and fifth rows show results corresponding to frames numbered 560, 570, 580, 590 and 600, respectively. The amount of light reflecting from the car's surface increases as the car moves toward the camera. The reflecting light causes a change in the camera iris which in turn causes all pixel values of the camera image to change. Such a change increases the number of false foreground detections. Compared to column 2, the false foreground detections, which are illustrated in column 3, do not occupy the whole image and are grouped in distinct objects. The fourth column illustrates a gradual automatic increase of the high threshold. The large shadow area caused by van is visible in each frame (column 1). The adaptive high threshold used by the disclosed method completely suppresses the shadow (column 3).

Example 4

Figure 16:
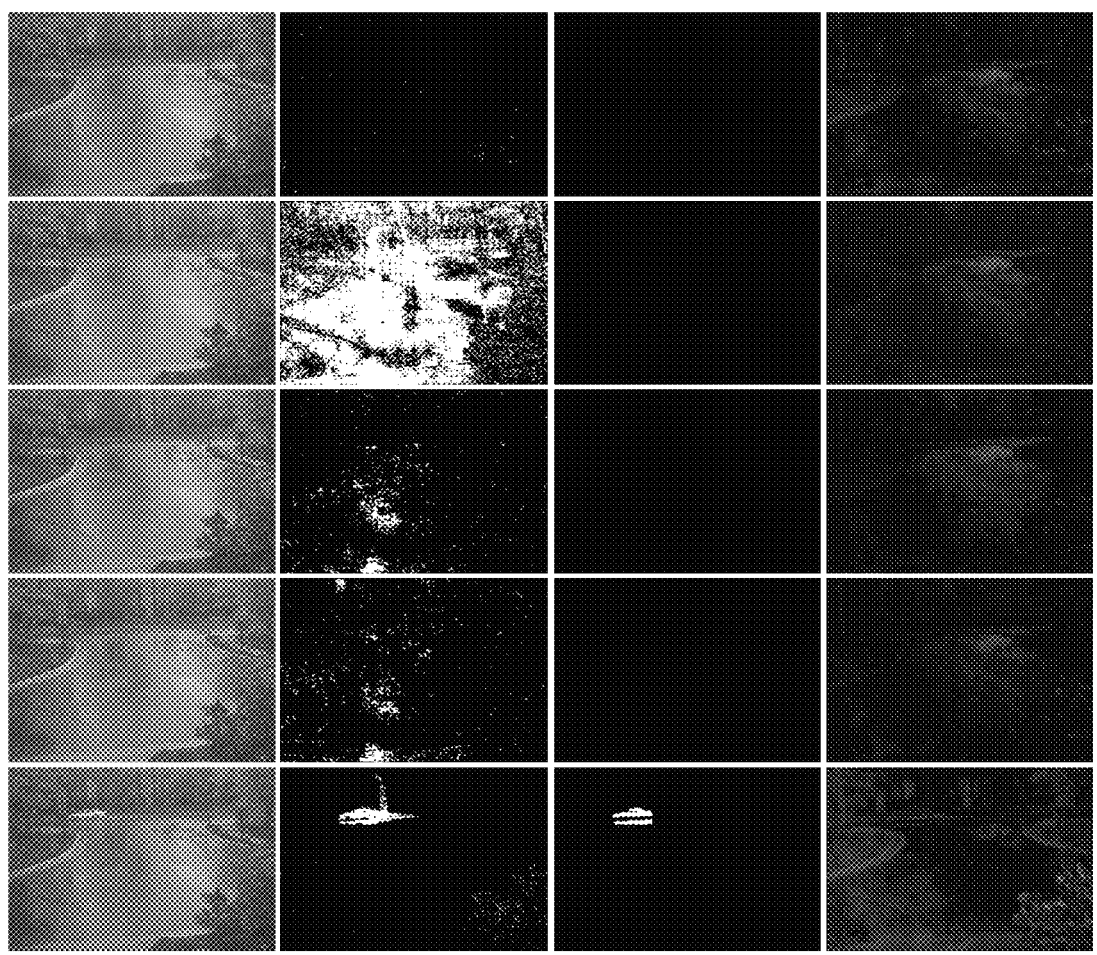

In the fourth example, illustrated in FIG. 16, background subtraction results using the GMM are compared to the disclosed method in a scene during a rainstorm. The first, second, third, fourth and fifth rows show results corresponding to frames numbered 4366, 4367, 4368, 4375 and 4471, respectively. The first three rows illustrate results during a flash of lightning. The fourth row illustrates the result of another flash of lightning occurring just after the first one. The last row shows moving car detection while a rain drop falls very close to the camera lens and with the wind causing clutter motion of the tree branches. During the flashes of lightning, the disclosed method did not detect any pixels as foreground (rows 2,3,4 and column 3). The moving car is detected better by the disclosed method than by the GMM method (row 5). The wet road and tree leaves are more sensitive to illumination and caused more false foreground detections (column 2). The adaptive high threshold eliminated all false detections and preserved the real foreground object (column 3). The second row shows the moment of lightning. The GMM is very sensitive to sudden illumination change, and almost the whole image was detected as a moving object. The proposed algorithm is very robust to this type of illumination change.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory processor-readable medium storing code representing instructions to be executed by a processor, the code comprising code to cause the processor to:
receive video data having a plurality of pixels;
classify each pixel from the plurality of pixels associated with an image as a foreground pixel or a background pixel using a threshold from a plurality of first thresholds and associated with that pixel, and a threshold from a plurality of second thresholds and associated with that pixel;
reset a value of a first threshold from the plurality of first thresholds associated with a first pixel from the plurality of pixels to a default first threshold value, the first pixel being classified as a foreground pixel;
update a value of a second threshold from the plurality of first thresholds associated with a second pixel from the plurality of pixels, the second pixel being classified as a background pixel, a first counter configured to count the number of successive frames the second pixel is classified as a background pixel having a value greater than a counter threshold; and
incrementing a second counter configured to count the number of successive frames a third pixel from the plurality of pixels is classified as a background pixel, the third pixel being classified as a background pixel, the second counter having a value less than the counter threshold, a third threshold from the plurality of first thresholds associated with the third pixel maintaining its value.

2. The non-transitory processor-readable medium of claim 1, further comprising code to cause the processor to:
reset a value of the threshold from the plurality of second thresholds associated with the first pixel from the plurality of pixels to a default second threshold value.

3. The non-transitory processor-readable medium of claim 1, further comprising code to cause the processor to:
reset a value of a first threshold from the plurality of second thresholds associated with the first pixel to a default second threshold value; and
update a value of a second threshold from the plurality of second thresholds associated with the second pixel.

4. The non-transitory processor-readable medium of claim 1, wherein the code to cause the processor to update the value of the second threshold from the plurality of first thresholds includes code to cause the processor to update the value of the second threshold based on a brightness of the second pixel and a background difference of the second pixel.

5. The non-transitory processor-readable medium of claim 1, wherein the image is a convoluted difference image, the code further comprising code to cause the processor to:
subtract pixel values of a background image of a scene from corresponding pixel values of a smoothed image of the scene to produce an altitude difference image;
weight each pixel value of the altitude difference image to produce a weighted difference image; and
convolve the weighted difference image to produce the convoluted difference image.

6. The non-transitory processor-readable medium of claim 1, wherein the value of the first threshold from the plurality of first thresholds is greater than a value of a threshold from the plurality of second thresholds associated with the first pixel.

7. The non-transitory processor-readable medium of claim 1, wherein the default first threshold value is associated with the first pixel, the code further comprising code to cause the processor to:
update a default first threshold value associated with the second pixel; and
maintain a default first threshold value associated with the third pixel.

8. A non-transitory processor-readable medium storing code representing instructions to be executed by a processor, the code comprising code to cause the processor to:
receive video data having a plurality of pixels;
classify each pixel from the plurality of pixels associated with an image as a foreground pixel or a background pixel using a low threshold from a plurality of low thresholds and associated with that pixel, and a high threshold from a plurality of high thresholds and associated with that pixel;
reset a value of the low threshold from the plurality of low thresholds and associated with a first pixel from the plurality of pixels to a predetermined low threshold value when the first pixel is classified as a foreground pixel; and
update (1) a value of the low threshold from the plurality of low thresholds and associated with a second pixel from the plurality of pixels, and (2) a value of the high threshold from the plurality of high thresholds and associated with the second pixel, when the second pixel is classified as a background pixel for a number of successive frames greater than a predetermined counter threshold.

9. The non-transitory processor-readable medium of claim 8, the code further comprising code to cause the processor to:
reset a value of the high threshold from the plurality of high thresholds and associated with the first pixel from the plurality of pixels to a predetermined high threshold value.

10. The non-transitory processor-readable medium of claim 8, wherein the code to cause the processor to reset the value of the low threshold associated with the first pixel includes code to cause the processor to reset the value of the low threshold associated with the first pixel based on at least one of a brightness of the first pixel or a background difference of the first pixel.

11. The non-transitory processor-readable medium of claim 8, wherein the code to cause the processor to update the value of the low threshold associated with the second pixel includes code to cause the processor to update the value of the low threshold associated with the second pixel based on at least one of a brightness of the second pixel or a background difference of the second pixel.

12. The non-transitory processor-readable medium of claim 8, wherein the image is a convoluted difference image, the code further comprising code to cause the processor to:
subtract pixel values of a background image of a scene from corresponding pixel values of a smoothed image of the scene to produce an altitude difference image;
weight each pixel value of the altitude difference image to produce a weighted difference image; and
convolve the weighted difference image to produce the convoluted difference image.

13. The non-transitory processor-readable medium of claim 8, the code further comprising code to cause the processor to:
maintain a value of a low threshold from the plurality of low thresholds and associated with a third pixel from the plurality of pixels when the third pixel is classified as a background pixel for a number of successive frames less than or equal to the predetermined counter threshold.

14. A non-transitory processor-readable medium storing code representing instructions to be executed by a processor, the code comprising code to cause the processor to:
receive video data having a plurality of pixels;
classify, at a first time a pixel from the plurality of pixels associated with an image as a background pixel, the pixel being associated with a threshold from a plurality of first thresholds and a threshold from a plurality of second thresholds;
update at least one of a value of the threshold from the plurality of first thresholds or a value of the threshold from the plurality of second thresholds when the pixel is classified as a background pixel for a number of successive frames that is greater than a value of a counter threshold;
classify, at a second time after the first time, the pixel as a foreground pixel; and
reset, in response to the pixel being classified as a foreground pixel, at least one of the value of the threshold from the plurality of first thresholds to a predetermined first threshold value or the value of the threshold from the plurality of second thresholds to a predetermined second threshold value.

15. The non-transitory processor-readable medium of claim 14, wherein the pixel is a first pixel, the threshold from the plurality of first thresholds is a first threshold from the plurality of first thresholds, the threshold from the plurality of second thresholds is a first threshold from the plurality of second thresholds, the code further comprising code to cause the processor to:
classify a second pixel from the plurality of pixels as a foreground pixel, the second pixel being associated with a second threshold from the plurality of first thresholds and a second threshold from the plurality of second thresholds; and
reset at least one of (1) a value of the second threshold from the plurality of first thresholds to the predetermined first threshold value, or (2) a value of the second threshold from the plurality of second thresholds to the predetermined second threshold value.

16. The non-transitory processor-readable medium of claim 14, wherein the code to cause the processor to update at least one of the value of the threshold from the plurality of first thresholds or the value of the threshold from the plurality of second thresholds includes code to cause the processor to update at least one of the value of the threshold from the plurality of first thresholds or the value of the threshold from the plurality of second thresholds based on a brightness of the pixel and a background difference of the pixel.

17. The non-transitory processor-readable medium of claim 14, wherein the image is a convoluted difference image, the code further comprising code to cause the processor to:
subtract pixel values of a background image of a scene from corresponding pixel values of a smoothed image of the scene to produce an altitude difference image;
weight each pixel value of the altitude difference image to produce a weighted difference image; and
convolve the weighted difference image to produce the convoluted difference image.

18. The non-transitory processor-readable medium of claim 14, wherein the pixel is a first pixel, the threshold from the plurality of first thresholds is a first threshold from the plurality of first thresholds, the threshold from the plurality of second thresholds is a first threshold from the plurality of second thresholds, the code further comprising code to cause the processor to:
update at least one of a value of a second threshold from the plurality of first threshold values and associated with a second pixel from the plurality of pixels or a value of a second threshold value from the plurality of second threshold values and associated with the second pixel when the second pixel is classified as a background pixel for a number of successive frames that is greater than the value of the counter threshold; and
maintain at least one of a value of a third threshold from the plurality of first threshold values and associated with a third pixel from the plurality of pixels or a value of a third threshold from the plurality of second threshold values and associated with the third pixel when the third pixel is classified as a background pixel for a number of successive frames that is less than or equal to the value of the counter threshold.

19. The non-transitory processor-readable medium of claim 14, wherein the code to cause the processor to classify the pixel as a background pixel includes code to cause the processor to classify the pixel as a background pixel at a first time, the code further comprising code to cause the processor to:
classify, at a second time after the first time, the pixel as a foreground pixel; and
reset, in response to the pixel being classified as a foreground pixel, a counter configured to count the number of successive frames the pixel is classified as a background pixel, to a predetermined counter value.

\* \* \* \* \*

UNITED STATES PATENT AND TRADEMARK OFFICE
CERTIFICATE OF CORRECTION

PATENT NO. : 9,230,175 B2  
APPLICATION NO. : 14/064713  
DATED : January 5, 2016  
INVENTOR(S) : Nikhil Gagvani et al.

Page 1 of 1

It is certified that error appears in the above-identified patent and that said Letters Patent is hereby corrected as shown below:

IN THE CLAIMS

Claim 18, line 9 (column 18, line 22) change "threshold values" to --thresholds--

Claim 18, line 11 (column 18, line 24) change "threshold value" to --threshold--

Claim 18, line 12 (column 18, line 25) change "threshold values" to --thresholds--

Claim 18, line 17 (column 18, line 30) change "threshold values" to --thresholds--

Claim 18, line 19 (column 18, line 32) change "second threshold" to --second thresholds--

Claim 18, line 20 (column 18, line 33) delete "values"

Signed and Sealed this  
Twelfth Day of April, 2016

Michelle K. Lee  
*Director of the United States Patent and Trademark Office*